United States Patent

Kubo et al.

[15] 3,681,583
[45] Aug. 1, 1972

[54] DEVICE FOR CONTROLLING THE ATTITUDE OF A SPACE SATELLITE UTILIZING GEOMAGNETIC FIELD

[72] Inventors: Moritada Kubo, Tokyo; Masamichi Shigehara, Yokohama-shi, both of Japan; Shozo Yasui, Cambridge, Mass.

[73] Assignee: Tokyo Shibaura Electric Co., Ltd., Horikawa-cho, Kawasaki-shi, Japan

[22] Filed: Sept. 22, 1969

[21] Appl. No.: 859,823

[30] Foreign Application Priority Data

Sept. 27, 1968 Japan...........................43/69504

[52] U.S. Cl....................................235/150.2, 244/1
[51] Int. Cl. ...........................G06f 15/50, B64g 1/10
[58] Field of Search ...................235/150.2; 244/1 SS

[56] References Cited

UNITED STATES PATENTS 3,061,239 10/1962 Rusk..................................244/1
3,359,407 12/1967 Paige..........................235/150.2
3,384,323 5/1968 Gilbert et al.......................244/1
3,489,372 1/1970 Ellis et al. .........................244/1

Primary Examiner—Malcolm A. Morrison
Assistant Examiner—Edward J. Wise
Attorney—Flynn & Frishauf

[57] ABSTRACT

The present invention enables the attitude of a spinning satellite to be effectively controlled by introducing current through an attitude control coil wound around the spin axis so as to allow the spin axis to be oriented to the desired direction on the basis of the interaction between coil current and the geomagnetic field. The direction and magnitude of current to be introduced into said attitude control coil is determined by composing a switching function $S = \vec{E} \cdot (\vec{K}_B \times \vec{B})$ using a vector operator from the vector $\vec{B}$ of an earth's magnetic field measured by a magnetometer, the vector $\vec{K}_B$ of the direction of the spin axis of the satellite supplied by an attitude sensor and an error vector $\vec{E}$ corresponding to the difference between the spin axis and desired direction as supplied by an error detector and then defining the notation and magnitude of the resultant function S.

4 Claims, 4 Drawing Figures

DEVICE FOR CONTROLLING THE ATTITUDE OF A SPACE SATELLITE UTILIZING GEOMAGNETIC FIELD

The present invention relates to a device for controlling the attitude of a space satellite utilizing geomagnetic field.

A spinning space satellite (hereinafter referred to as the "satellite") is generally so designed as to keep its spin axis in a fixed direction even when there is applied some disturbance torque. This is the most simple method that has ever been proposed to stabilize the satellite's attitude and is generally known as the spin stabilizing method. In this case, the direction of the spin axis is determined when the satellite is sent up, namely, when it completes its travel along the launching orbit and is settled on the circular orbit of the earth. Generally, said spin axis is originally so set by a satellite launching mechanism as to fall within the orbital plane of the satellite. For practical purposes, however, there are occasions on which there is afforded greater advantage by orientating said spin axis to other directions. For example, with a satellite having an antenna stretched parallel to its spin axis, there will be afforded greater convenience in effecting communication with the earth, if the satellite is so positioned as to allow its spin axis to be perpendicular to its orbital plane. This is known as the wheel type spin stabilizing method. To this end, there are demanded techniques of reorientating the spin axis of a satellite to a desired direction during its flight. Among these techniques is included a process of utilizing geomagnetic field. This process consists in winding an attitude control coil about the spin axis of a satellite, introducing current into said coil so as to allow the satellite to form a magnetic dipole and generating a torque acting thereon by the interaction between said dipole and geomagnetic field. To orientate the spin axis of a satellite to a desired direction, it is necessary to control the magnitude and direction of current to be introduced into the aforesaid coil so as to generate a torque adapted to meet the object.

With said process, however, the magnitude and direction of a coil current suitable to orientate the spin axis of a satellite to a desired direction were expressed in complicated functions such as the vector of the spin axis in a desired direction, the vector representing the direction of the rotating spin axis at a certain point of time during the flight of the satellite and the vector of geomagnetic field prevailing at its given location. Moreover, the values of these functions successively changed with the momently varying attitude and location of the satellite. Accordingly, it was extremely difficult to electrically control the attitude of the satellite. The prior processes proposed to cope with such problem include, for example, the one disclosed in literature "Pre-print from Proccedings of IAA/JACC Guidance and Control Conference, Aug. 15, 1968". This process consisted in introducing a direct current having a fixed amplitude into the attitude control coil, and changing the current direction per unit of time equal to one-fourth of the orbit so as to control the satellite's attitude. With said process, the pattern of control current was predetermined and the control device was simple. Since, however, said control system was essentially of an open loop type, the process had the drawback that it failed to carry out accurate control.

The object of the present invention is to determine the magnitude of current to be supplied to the aforesaid attitude control coil from the direction of the spin axis of a satellite while it is making an orbital motion, as well as from the intensity and direction of geomagnetic field and other related factors, and more particularly to effect current control automatically by means of a closed loop control system. Namely, the attitude control system of the present invention consists in determining the vector $\vec{B}$ of a geomagnetic field prevailing at the location of the satellite in orbital motion, the vector $\vec{k_B}$ of the satellite's attitude and an error vector $\vec{E}$ ($\vec{E} = \vec{H} - \vec{Hf}$) corresponding to the difference between the vector $\vec{H}$ of the angular moment of the satellite in the direction of said attitude vector and the vector $\vec{Hf}$ of the angular moment thereof in a desired direction, computing a switching function $S = \vec{E} \cdot (\vec{k_B} \times \vec{B})$ defined from these vectors and switching the direction of current to be introduced into an attitude control coil according to the notation of the resultant function S so as to reduce the error vector $\vec{E}$ to zero. For the practical arrangement of the closed loop used in the control system of the present invention, there may be contemplated two methods. One of them is the on-board type wherein the loop is fully enclosed within a satellite. With this type, an attitude sensor, gyroscope, magnetometer, data processing device for processing outputs from these instruments so as to figure out a switching function, and computer are all placed aboard the satellite. With the other method, there are mounted aboard the satellite an attitude sensor and magnetometer. Information measured by these instruments is sent by telemeter to a ground station, which in turn takes charge of the operation of other necessary instruments for processing data and determining the magnitude of current to be introduced into an attitude control coil and transmits to the satellite only outputs from said instruments as a command signal for the coil current. The latter method required that information be always unfailingly transmitted across the satellite and ground station. Generally, communication between the satellite and ground station can only be effected when the satellite is positioned in the field of vision of the ground station, so that for constant communication therebetween, it is necessary to set up at various parts scattered over the earth a large number of ground stations capable of controlling the satellite. Since, however, this is practically infeasible, there is raised the problem how the attitude of a satellite can be controlled while it travels outside of the field of vision of the ground station. To resolve this question, there may be contemplated a method of leaving the spin axis as it is without introducing current into an attitude control coil, while the satellite is positioned outside of said field of vision. However, the time of leaving the spin axis intact is loss of time from the standpoint of ensuring constant control, namely, this length of time means an extra period which would be required in correcting the spin axis to a desired direction. To save such loss of time, it may be deemed advisable to supply larger amounts of current to said attitude control coil thereby positively to accelerate the inclination of the spin axis. However, this will increase the nutation or oscillation of the spin axis too much for a nutation damper to remove it effectively from moment to moment, so that in the worst case, the damper will most likely be destroyed.

According to the present invention, therefore, there is placed aboard a satellite a programmer for controlling current to be introduced into the attitude control coil, and where communication is established between the satellite and ground station the information previously set in said programmer is reset by the predetermined control information, thereby carrying out the effective control of said coil current during the interval before electrical contact is made a second time between the satellite and ground station. To this end, the ground station computes fresh information for a programmer effectively and properly by simulating a computer, and transmits the resultant information to the satellite. In the ground station there is set up a satellite model provided with information on an orbital motion, geomagnetic field and other factors corresponding to those occurring in an actual satellite by means of simulation using, for example, a computer. The satellite model is simulated with the initial condition including the orbit, attitude and other factors of an actual satellite determined when it flies through the air over the ground station. Momentary variations in the vector $\vec{k}_B$ of the satellite's attitude, error vector $\vec{E}$ and geomagnetic vector $\vec{B}$ are determined by observing the behavior of the satellite model under the aforesaid condition. A switching function S is determined from the values of these factors by a computer. Based on the notation of said function $S$ is defined the pattern of control current which is supplied to the satellite by being incorporated in the program.

However, the problem raised here is that there is consumed a considerable length of time between the receipt of signals associated with the orbit, attitude and other conditions of an actual satellite during its flight over the ground station and the determination of the pattern of control current from the aforesaid satellite model even with the aid of an electronic computer, so that it is difficult to finish such operation while the actual satellite still remains in the field of vision of the ground station. For resolution of this question, therefore, the control device of the present invention defines by the simulator of the ground station a program to be used during the interval between the time the satellite communicates with the ground station for $(n + 1)$-th time and the time said communication is given for the $(n + 1)$-th time, from the signals received in connection with the orbit, attitude and other conditions of the satellite when communication was previously given therefrom to the ground station for the $n$th time. The program thus defined is supplied to the satellite as a command signal when it communicates with the ground station for the $(n + 1)$-th time. The aforementioned simulation consists of two types, i.e., prediction simulation for anticipating the orbit, attitude and other conditions of the actual satellite when it communicates with the ground station for the $(n+1)$-th time and operation simulation for defining the pattern of control current by furnishing the satellite model with information on said estimated orbit, attitude and other conditions so as to determine a switching function as described above.

It is accordingly an object of the present invention properly to control the attitude of a satellite according to momently occurring changes in its various conditions including its orbit and attitude.

Another object of the invention is to use a closed loop system for control of the satellite's attitude.

Still another object of the invention is to simplify the satellite equipment by installing part of the closed loop system for said attitude control in the ground station.

A further object of the invention is to provide a useful device to prepare command information for said attitude control to be carried out by the ground station.

The present invention can be more fully understood from the following detailed description when taken in conjunction with the accompanying drawings, in which.

Figure 1:
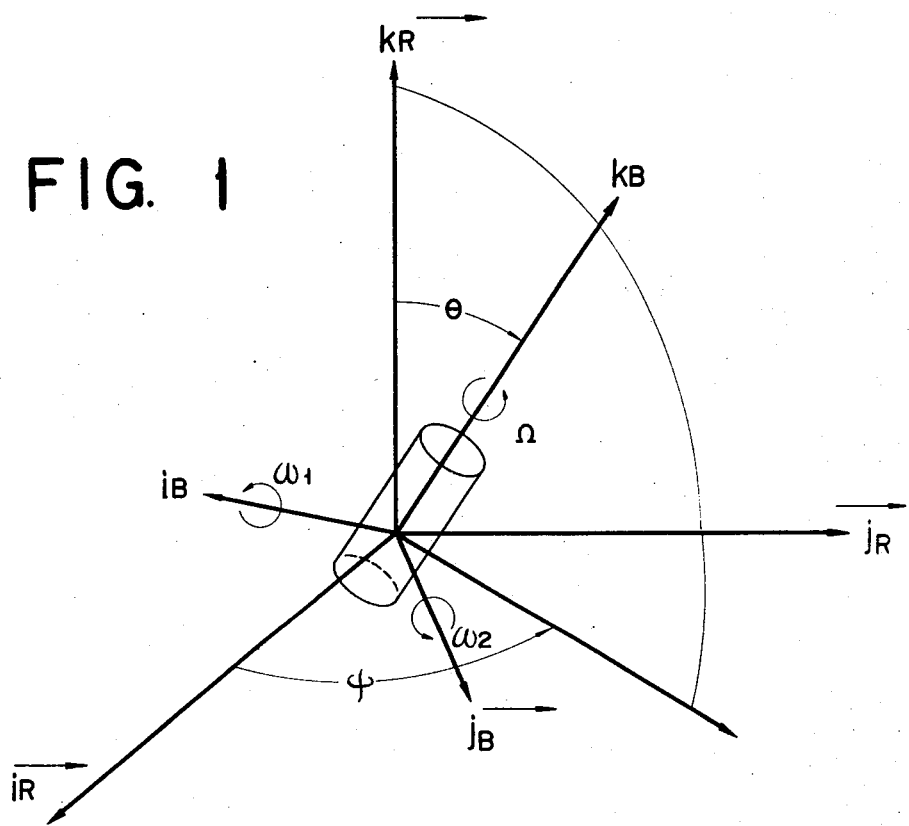
FIG. 1 is a co-ordinate system representing a satellite's attitude by way of illustrating the principle of the present invention.
Figure 2:
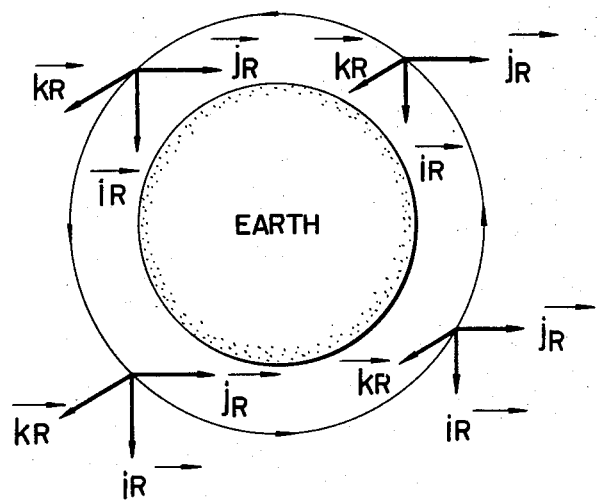
FIG. 2 shows directional vectors on a satellite's orbit.

Let us take the right hand co-ordinate system of $\vec{i}_B, \vec{j}_B$ and $\vec{k}_B$ fixed to the satellite as illustrated in FIG. 1 and designate the angular speeds (of the spin) around the respective axes as $\omega_1$, $\omega_2$ and $\Omega$. Further assuming that the satellite is positioned symmetrical with respect to the spin axis, let the inertial efficiency around said spin axis be denoted as Is and the inertial efficiency around the axes $\vec{i}_B$ and $\vec{j}_B$ alike as Ip. With respect to the other co-ordinate system of $\vec{i}_R, \vec{j}_R$ and $\vec{k}_R$, let it be assumed that the final desired direction does not rotate through an inertial space shown in FIG. 2 and that the axis $\vec{k}_R$ is orientated in the target direction of the spin axis. Also assume the direction $\vec{k}_B$ of the spin axis at a given point of time to define two angles $\Psi$ and $\theta$, as shown in FIG. 1, with respect to the co-ordinate system of $\vec{i}_R, \vec{j}_R$ and $\vec{k}_R$ and $\theta$ of said two angles to directly represent the angle of the directional error of the spin axis. With the vector of the angular moment of the satellite represented by $\vec{H}$, the vector of control torque by $\vec{T}$ and the vector of disturbance torque by $\vec{D}$, then there is derived from Newton's law of motion the following equation $$d\vec{H}/dt = \vec{T} + \vec{D} \qquad 1$$

Further, the vector $\vec{T}$ of control torque may be expressed as the product of the vector $\vec{M}$ of the dipole moment of the electromagnetic coil and the vector $\vec{B}$ of geomagnetic induction, i.e., $$\vec{T} = \vec{M} \times \vec{B} \qquad 2$$

Since $\vec{M}$ acts in the same direction as $\vec{k}_B$, $$\vec{M} = U\vec{k}_B \qquad 3$$

The value of $U$ used in the above equation is proportionate to the magnitude of current to be introduced into the attitude control coil and may be expressed as follows.

$$U = nAi \qquad 4$$

where:

$n$: number of coil turns $A$: cross sectional area of the coil $i$: current which is regarded as positive when it flows in the direction of $\vec{k_B}$, namely, to the right hand.

The desired condition where the spin axis agrees with the axis $\vec{k_B}$ may be expressed as follows in terms of the vector of angular moment. $Hf = Is\Omega \vec{k_R}$       5

On the other hand, the vector of angular moment under a given condition may be denoted as follows:

$$\vec{H} = I_p \dot{\Omega} \, \vec{i_B} + I_p \Omega_2 \vec{J_B} + Is\Omega \vec{k_B} \qquad 6$$

The difference between the above mentioned Hf and H may be deemed as a vector error. With said error designated as E, the error vector $\vec{E}$ may be expressed as follows:

$$\vec{E} = \vec{H} - \vec{Hf} \qquad 7$$

The final object of the present invention is to reduce $\vec{E}$ to 0 or zero. In this case, the aforesaid equation 1 may be rearranged as follows from equations 2, 3, 7 and $d\vec{Hf}/dt = 0$:

$$d\vec{E}/dt = U(\vec{k_B} \times \vec{B}) + \vec{D} \qquad 8$$

Further, multiplying both terms of equation 8 by $\vec{E}$, then there will result $$1 dE^2/2dt = U\vec{E} \cdot (\vec{k_B} \times \vec{B}) + \vec{E} \cdot \vec{D} \qquad 9$$

where:

$$E: |\vec{E}|$$

$U$ in equation 9 represents the only control value proportionate to the coil current.

Let it be assumed that a switching function is defined by means of the bang-bang control system generally employed in controlling the attitude of a flying body. Then the aforesaid value $U$ will be $$U = -\alpha^2 \ (S>0) \qquad 10a$$

or $$U = \alpha^2 \ (S<0) \qquad 10b$$

Namely, $$U = -\alpha^2 \, \text{sgn} \, S \qquad 11$$

where:

$\alpha^2$: a constant for defining the bang-bang level $S$: a function expressed as $\vec{E} \cdot (\vec{k_B} \times \vec{B})$ used in switching the coil current When, therefore, the aforementioned control is performed using this switching function S, then equation 10a may be rearranged as follows:

$$\tfrac{1}{2} \cdot dE^2/dt = -\alpha^2 |\vec{E} \cdot (\vec{k_B} \times \vec{B})| + \vec{E} \cdot \vec{D} \qquad 12$$

The disturbance torque D is considered to result from the radiation pressure from the sun, gravity, air force, thermal elasticity of the antenna and other parts of the control device, etc. However, if the value of $\alpha^2$ is so chosen as to rise above a certain level, then there will result $dE^2/dt < 0$     13
except when $\vec{E} \cdot (\vec{k_B} \times \vec{B})$ extremely decreases.

As apparent from the above discussion, the magnitude of errors can be gradually decreased by changing the notation of the control value $U$ or the direction of current to be introduced into the attitude control coil according to the notation of the switching function S, thereby eventually reducing $E$ to zero.

Figure 3:
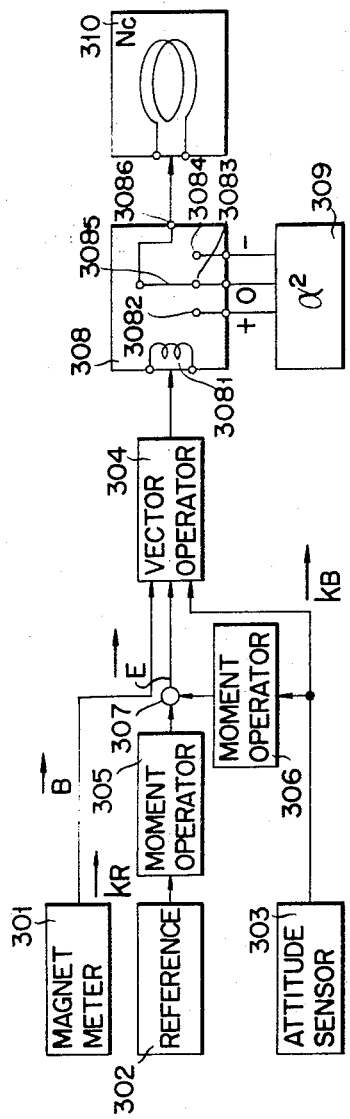
FIG. 3 is a schematic block diagram of the on-board type attitude control device according to the invention.

FIG. 3 is a schematic arrangement of a device wherein the above described principle of the present invention is applied in the on-board type attitude control. Numeral 301 denotes a magnetometer which detects the vector of geomagnetic field prevailing at the momently changing point on a flying satellite's orbit. Said magnetometer includes a flux gate magnetometer, search coil magnetometer and proton precession magnetometer. Moreover, most preferable for installation in an actual satellite is a small, light one. A reference platform 302 provides a reference direction, namely, the direction of the axis $\vec{k_R}$ included in the aforesaid coordinate system of $\vec{i_R}$, $\vec{j_R}$ and $\vec{k_R}$. The device of the present invention consists in controlling the satellite's attitude such that it agrees with this reference direction while there may be used a gyroscope for said control, it can also be carried out by determining the position of the sun, stars or earth. An attitude sensor 303 is intended to detect the attitude of a travelling satellite. To this end, there are used, for example, a horizon sensor, sun sensor, star tracker and gyroscope. The vector $\vec{B}$ of geomagnetic field measured by the magnetometer 301 is supplied to a vector operator 304. Information on the desired direction to which the satellite is to be controlled is supplied through the reference platform 302 to a first computer 305 which figures out from equation 5 above the inertial moment $\vec{Hf}$ of the satellite around the desired direction $\vec{k_R}$. And the vector $\vec{k_B}$ of the satellite's attitude detected by the attitude sensor 303 is supplied to the vector operator 304 and also to a second computer 306. Said second computer 306 computes from equation 6 above the inertial moment $\vec{H}$ around the direction of the vector $\vec{k_B}$ of the attitude of the satellite during its flight. The vector values $\vec{Hf}$ and $\vec{H}$ figured out by these first and second computers 305 and 306 are supplied to an error detector 307, which computes from equation 7 above the value of an error vector $E$.

Figure 4:
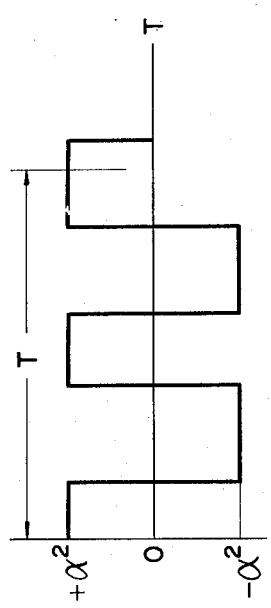
FIG. 4 indicates the wave form of the pattern of control current.

The value of said error vector $\vec{E}$ is supplied to the input side of the vector operator 304, which computes a switching function S from the vectors $\vec{B}$, $\vec{E}$ and $\vec{k_B}$ supplied to said input side using an operation equation $S = \vec{E} \cdot (\vec{k_B} \times \vec{B})$. At the output side of said vector operator 304 is generated a signal current corresponding to the positive or negative notation of the switching function. This signal current is supplied to an electromagnetic coil $308_1$ disposed on the input side of a three-positioned controller 308. This controller is a three-contact switch, to the three contacts $308_2$, $308_3$ and $308_4$ of which is supplied a current having a magnitude of $+\alpha^2$, 0 or $-\alpha^2$ from a D.C. source 309. A movable contact strip $308_5$ is normally positioned at the middle contact $308_3$ and, when the electromagnetic coil $308_1$ on the input side is supplied with a negative signal, is shifted to contact $308_2$, allowing a current having a magnitude of $+\alpha^2$ to be produced at the output terminal $308_6$ of said controller 308. When the electromagnetic coil $308_1$ is supplied with a positive signal, said movable contact strip $308_5$ is brought to the contact $308_4$, allowing a current having a magnitude of $-\alpha^2$ to be generated at the output terminal $308_6$ of said controller 308. These output currents from said controller 308 are supplied to the attitude control coil 310 of the satellite. Said attitude control coil 310 is fixed to the satellite body in such a manner that the normal Nc of the coil becomes parallel to the spin axis. Thus the current flowing through the coil 310 is changed in direction by said three-positioned controller 308, the pattern of current thus changed being presented in FIG. 4. As seen from this figure, if a switching function has a positive value, then there will flow a current of $-\alpha^2$ through the control coil 310, and if the switching function has a negative value, then there will flow a current of $+\alpha^2$.

What we claim is:

1. A device for controlling the attitude of a space satellite comprising:
   means for computing a switching function $S = \vec{E} \cdot (\vec{k_B} \times \vec{B})$ from the vector $\vec{B}$ of the geomagnetic field at the point of the satellite in the orbit, the vector $\vec{k_B}$ of the satellite's attitude, and an error vector $\vec{E}$ corresponding to the difference between the vectors of the satellite's angular moment in the direction of said attitude vector and in a desired direction,
   a coil fixed to the satellite for controlling its attitude, a source for supplying current to said attitude control coil, and switching means responsive to said operation device for controlling current from said source according to the value of the switching function S is which is computed by said operation device.

2. A device for controlling the attitude of a space satellite provided on the satellite utilizing the geomagnetic field which comprises:
   a coil fixed to the satellite for controlling its attitude,
   means for detecting the vector $\vec{B}$ of the geomagnetic field at the point of the satellite in the orbit,
   means for detecting the vector $\vec{k_B}$ of the satellite's attitude,
   means for determining an error vector $\vec{E}$ corresponding to the difference between the vectors of the satellite's angular moment in the direction of the attitude vector and a desired direction,
   means for generating a switching function $S = \vec{E} \cdot (\vec{k_B} \times \vec{B})$ from the values of these vectors, and
   switching means responsive to said generating means for controlling current to be introduced into the attitude control coil in accordance with said switching function.

3. A process for controlling the attitude of a spinning satellite having an attitude control coil wound around the spin axis thereof comprising the steps of:
   obtaining the vector $\vec{B}$ of the geomagnetic field at the position of the satellite in the orbit,
   obtaining the vector $\vec{K_B}$ of the satellite's attitude,
   obtaining an error vector $\vec{E}$ corresponding to the difference between the vectors of the satellite's angular moment in the direction of the attitude vector and a desired direction,
   obtaining a switching function S by combining said vectors $\vec{B}$, $\vec{K_B}$ and $\vec{E}$ in accordance with a predetermined relationship $S = \vec{E} \cdot (\vec{k_B} \times \vec{B})$, and
   controlling the magnitude and direction current to be introduced into said control coil in accordance with said switching function S, to orient the spin axis of the satellite to the desired direction on the basis of the interaction between coil current and the geomagnetic field.

4. A process for controlling the attitude of a spinning satellite according to claim 3 further comprising the steps of:
   obtaining first information on the location and attitude of the satellite when it communicates with a ground station for the $n$th time,
   obtaining second information predicting the location and attitude of the satellite when it communicates with the ground station for the $(n+1)$th time by using said first information,
   obtaining third information predicting simulating vectors $\vec{B}$, $\vec{K_B}$ and $\vec{E}$ in accordance with said second information, and controlling the attitude of said satellite during the $(n+1)$th time period in accordance with said third information.

* * * * *